Figure 1:
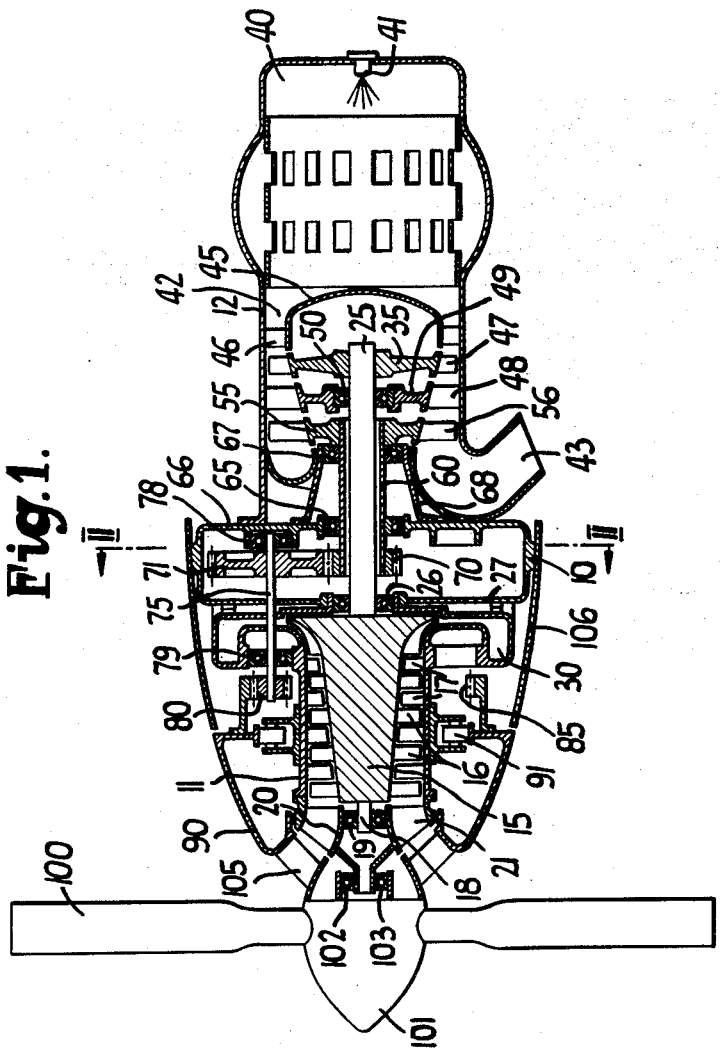

June 5, 1962 H. LEIBACH 3,037,347
PROPELLER DRIVE TRANSMISSION FOR A GAS TURBINE ENGINE
Filed July 24, 1961 2 Sheets-Sheet 2

INVENTOR
HEINRICH LEIBACH
By Gruex Marechal Jr
ATTORNEY

United States Patent Office 3,037,347
Patented June 5, 1962

3,037,347
PROPELLER DRIVE TRANSMISSION FOR A GAS TURBINE ENGINE
Heinrich Leibach, Munich, Germany, assignor to M.A.N.-Turbomotoren G.m.b.H., Munich, Germany, a corporation of Germany
Filed July 24, 1961, Ser. No. 126,277
Claims priority, application Germany Aug. 2, 1960
7 Claims. (Cl. 60—39.16)

This invention relates to turboprop engines for aircraft and the like in which a propeller is driven through a reduction gear drive by a gas turbine internal combustion engine and, more particularly, to such turboprop engines in which the driveshaft connecting the propeller to the reduction gearing is hollow and surrounds at least the air intake end of the gas turbine engine or the compressor portion thereof.

As will be understood, aircraft turboprop engines of the character to which this invention relates may include an aircraft propellor driven for rotation through a reduction gear drive from a gas turbine power unit comprising a compressor for compressing combustion air, a combustion chamber where fuel is burned in such compressed combustion air to produce energy, and turbine elements driven by the combustion gases from the combustion chamber for driving both the air compressor and the propeller. Also, as well understood, for reasons of compactness and efficiency of design, etc., it may be desired to have the axis of rotation of the propeller coaxially aligned with the coaxially rotating compressor and turbine elements of the engine.

In simple development of such an engine, it may be desired to have an axially disposed air intake opening at the front of the engine (i.e., immediately behind the propeller) and with the air compressor disposed immediately behind the air intake, while the combustion chamber and turbine elements driven by the gases therefrom are arranged rearwardly of the compressor. As will be apparent from such an arrangement, the main drive turbine for providing driving power to the propeller may be located at a position considerably separated or remote from the propeller and behind the air intake and compressor unit, so that some difficulty may be encountered in arranging a mechanical gear drive to transmit driving power from the main turbine to the propeller while still maintaining the coaxial alignment of all rotating parts in the necessary sequence thereof for desired engine operation.

If it is attempted to alleviate such difficulties by having the propeller connected to the power transmission by a hollow drive shaft or sleeve within which are arranged the various rotating compressor and/or turbine parts, additional difficulties may arise in the construction and/or mounting of such a hollow shaft large enough to rotate around and contain the entire compressor and/or turbine element parts. Thus, even if such a construction might be satisfactorily arranged to accommodate turbine engines of relatively low power and, consequently, relatively small size and/or diameters, increasing the size of the engine, to increase the power thereof, may quite rapidly introduce substantial difficulties in constructing and mounting an adequately large diameter and strong hollow shaft for satisfactorily transmitting the driving torque to the propeller hub and yet large enough to enclose and rotate around the entire engine with sufficient strength and stability yet without subdividing and/or internal bracing, etc., which would interfere with the rotation or strength or mounting of the hollow driveshaft.

According to this invention, however, turboprop engines of the character described are provided, and of a variety of sizes and power outputs as may be desired, with the propeller coaxially aligned with and preposed to coaxially rotating compressor and turbine engine parts, and with the propeller being coupled to or driven by a relatively short hollow shaft or sleeve rotating around the air intake end of the compressor, which hollow shaft or sleeve is in turn connected by a mechanical gearing to the main drive turbine in a manner so that the hollow driveshaft or sleeve does not and need not contain or surround the entire compressor and turbine components of the engine, and, as a further feature of this invention, the gear drive or transmission is preferably arranged axially between the compressor and turbine elements of the engine for relatively short-coupled driving connection with the hollow shaft, and all in a manner whereby the size and power of the various engine components, particularly the drive turbine components, may be substantially increased as may be desired without necessarily requiring a correspondingly large increase in the length or diameter of the hollow driveshaft or, even, the entire outer diameter or dimension of the space enclosing the reduction gear transmission and other engine parts.

With the foregoing and other objects in view, this invention will be described in more detail, and other objects and advantages thereof will be apparent from the following description, the accompanying drawings, and the appended claims.

Figure 2:
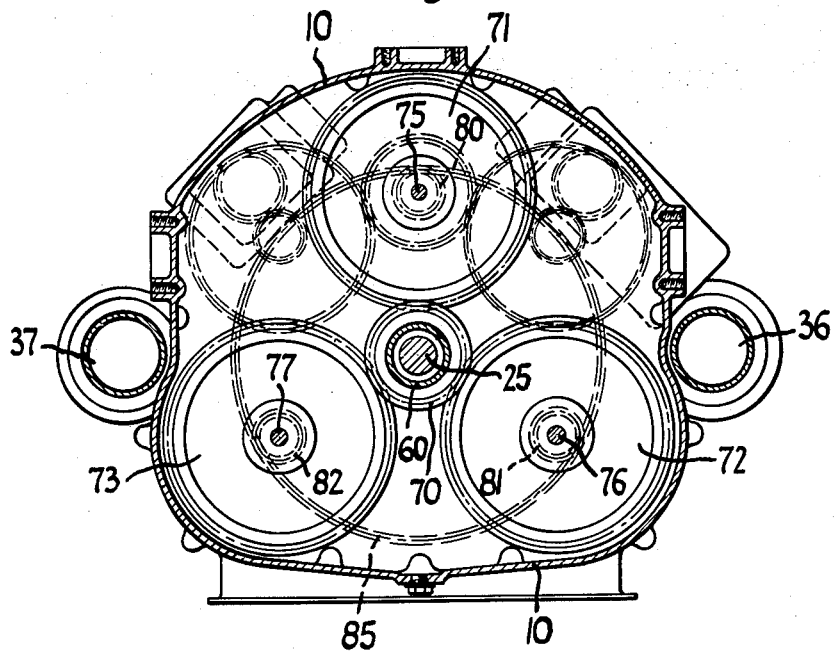

In the drawings:

FIG. 1 is a vertical axial section through a turboprop engine construction embodying and for practicing this invention; and FIG. 2 is a section along the line II—II of FIG. 1.

Referring to the drawings, in which like reference characters refer to like parts throughout the several views thereof, a turboprop engine construction in accordance herewith is illustrated as including a main frame or housing 10 on one side of which is mounted an axially extending compresor housing 11 and, one the opposite side, an axially extending turbine housing 12. Within compressor housing 11 is a conventional compressor comprising a rotor 15 carrying therearound compressor blades 16 for interaction, in known manner, with stationary guide vanes 17 carried by compressor housing 11 to compress air thereinto.

One end of compressor rotor 15 is supported for rotation as by stud shaft 18 carried by a bearing member 19 supported in an annular supporting sleeve 20 mounted centrally in the open or air intake end of compressor housing 11 as by a plurality of separate and spaced radially extending ribs 21. The opposite end of rotor 15 is mounted for rotation as by compressor shaft 25 and bearing member 26 carried by radially extending webs 27 of main frame 10. As indicated in the drawing, the right-hand end of compressor housing 11 is developed to form an annular collecting or output channel or conduit 30 for receiving or conducting air compressed by compressor blades 16, and with the walls of channel 30 forming means for supporting compressor housing 11 on radial webs 27 of main frame 10.

On the end of compressor shaft 25 opposite to that carried by bearing 26 is mounted compressor drive turbine 35, rotation of which, as hereinafter explained, drives compressor rotor 15 effecting compression of air entering air intake at the left-hand end of compressor housing 11 around annular sleeve 20 and between radial ribs 21, in known manner. Air compressed by compressor rotor 15 and blades 16 is collected in output conduit 30 and conducted by two feed ducts 36 and 37 to the combustion chambers 40 carried by or formed as extensions of turbine housing 12. Fuel is injected into combustion chamber 40, as indicated by injection nozzle 41, and burned in the combustion chamber, in known manner, to form hot combustion driving gases which leave combustion chamber 40 through an annular passage 42.

As indicated, annular passage 42 is defined in part by a circular partition 45 mounted within turbine housing 12 as by radial ribs 46, which also serve as stationary guide vanes coacting with turbine blades 47 on compressor drive turbine 35. Another set of radial ribs or guide vanes 48 also serves for mounting an annular ring 49 within turbine housing 12 and carrying an additional bearing member 50 for shaft 25.

Also mounted for rotation coaxially with the foregoing rotating members, but mechanically separate from compressor drive turbine 35, is main drive turbine 55 carrying turbine blades 56 so as to be driven by the hot combustion gases from combustion chamber 40. Main drive turbine 55 is mounted on a hollow shaft 60, coaxially around shaft 25, and supported for rotation by bearing member 65 carried by a radial web 66 of main frame 10, and also by bearing member 67 carried by an annular bracket 68 extending from radial web 66, which parts also cooperate in supporting on main frame 10. Through channel 43 the exhaust gases leave the turbine and enter into the atmosphere.

On the end of hollow shaft 60 opposite to main drive turbine 55 is mounted a central gear 70 around which are symmetrically mounted in meshing engagement therewith gears 71, 72, and 73, on jack shafts 75, 76, and 77, respectively, supported as by bearing members 78, 79, etc., carried, respectively, by radial web 66 of main frame 10 and the right-hand end of compressor housing 11 adjacent collecting channel 30, as illustrated. Jack shafts 75–77 are preferably somewhat torsionally elastic for imparting torque from gears 71–73 to pinions 80, 81, and 82 carried at the opposite ends of jack shafts 75–77, respectively. Pinions 80–82 are in meshing engagement with an internal gear ring 85 extending from a hollow shaft or driving sleeve 90 mounted for rotation around the intake or left-hand end of compressor housing 11 and supported thereon for rotation, in known manner, as by bearing members 91.

As will be apparent from the foregoing description, hot combustion gases leaving combustion chamber 40 through annular passage 42 impinge upon blades 47 of compressor drive turbine 35, thus driving it to rotate compressor rotor 15 to compress combustion air for introduction and combustion in chamber 40. Similarly, the hot gases from combustion chamber 40 also impinge upon blades 56 of main drive turbine 55 for driving it to produce the main power output of the engine.

Rotation of main drive turbine 55 produces rotation of hollow shaft 60, which in turn drives central gear 70. Power is thus transmitted from gear 70 to the gears 71–73 meshing therewith, and thence through jack shafts 75–77 to pinions 80–82, which rotate and drive hollow drive sleeve 90 through internal gear ring 85 thereon. That is, the driving power or torque produced by main drive turbine 55 is directly and mechanically transmitted, through a reduction gearing transmission, back to the front or left-hand end of the engine and without interfering with the coaxial rotation of the various parts and/or the axial arrangement thereof. Also, the gear transmission elements 70—77 are positioned axially between compressor 15 and turbines 35 and 55 so that neither the diameter of hollow drive sleeve 90 nor the outside dimensions of the gear transmission mechanism is necessarily dependent upon nor controlled by the size or diameter desired for the turbines 35 or 55, nor is the mechanical power transmission undesirably complicated or attenuated by the axial positioning or spacing or relationship of the rearwardly positioned turbines 35 or 55.

Also as indicated in FIG. 1, a conventional aircraft propeller 100 is mounted in known manner on a propeller hub 101, which is, in turn, mounted for rotation on a bearing member 102 supported by a central annular extension 103 from annular sleeve 20, mounted, as above noted, within the air intake of compressor housing 11 by spaced radial ribs 21. A plurality of spaced radial ribs 105 connect propeller hub 101 with hollow driving sleeve 90 so that propeller hub 101 and propeller 100 are directly driven for rotation by hollow driving sleeve 90 as it is driven through the reduction gear transmission from main drive turbine 55 as above explained.

As will also be understood, the number and spacing of radial ribs 21 and moving radial ribs 105 are selected so as not substantially to interfere with air intake into compressor housing 11, while still providing adequate supporting or driving force for driving propeller 100 from hollow sleeve 90 and for supporting annular sleeve 20 in position as described. Preferably, as indicated in the drawings, propeller hub 101 and the outer surface of hollow driving sleeve 90 are provided, in known manner, with a suitable or satisfactorily aerodynamic outer shape or configuration, and a further outer skin or shell member 106 is preferably provided as a covering between rotating hollow drive sleeve 90 and main frame 10 to form a satisfactory aerodynamic outer configuration or development as desired for the engine.

As will be apparent from the foregoing, then, there is provided in accordance with this invention a construction for a turboprop aircraft engine in which the propeller is directly driven by a hollow drive sleeve through a reduction gear drive from a main drive turbine, and yet so arranged that an axial air intake is provided in the nose of the engine and also space for at least a part of the turbine compressor to operate within the hollow driving sleeve, yet with the overall size of the engine and, particularly the unsupported hollow size of the drive sleeve, being compactly arranged and not disadvantageously controlled or complicated by utilizing compressor drive and main drive turbines of increased size; yet with a direct and substantially short-coupled power transmission from the main drive turbine to the propeller and with the main drive turbine and the compressor drive turbine being mechanically separate for independent operation and control as may be desired, and with all the foregoing elements compactly and efficiently combined into a coaxially aligned rotary engine mechanism of aerodynamically advantageous shape and configuration for utilization as aircraft propulsion means.

While the apparatus herein disclosed form preferred embodiments of this invention, it is to be understood that this invention is not limited to these precise forms of apparatus and that modifications may be made therein without departing from the scope of this invention which is defined in the appended claims.

What is claimed is:

1. In a turboprop engine of the character described and including coaxially aligned compressor and turbine elements for driving a rotating propeller, the combination which comprises reduction gearing transmission means interposed between said compressor and turbine elements, a hollow driving sleeve, means for mounting said hollow driving sleeve for rotation around at least a portion of said compressor adjacent said propeller and radially outwardly spaced from said compressor, means forming driving connections between said turbine and said reduction gearing transmission and between said transmission and said hollow driving sleeve for rotation of said hollow driving sleeve upon rotation of said turbine, and means forming a driving connection between said hollow driving sleeve and said propeller for driving rotation of said propeller by said turbine through said transmission and said hollow driving sleeve.

2. In a turboprop engine of the character described and including a rotating propeller and coaxially aligned compressor and turbine elements for driving said rotating propeller, said coaxially aligned compressor and turbine elements being disposed behind said propeller and axailly in the sequence recited, and a combustion chamber for producing hot gases for driving impingement on said turbine elements for driving said propeller and said compressor, the combination which comprises reduction gearing transmission means interposed between said coaxially aligned compressor and turbine elements, a hollow driving sleeve, means for mounting said hollow driving sleeve for rotation around at least a portion of said compressor adjacent said propeller and radially outwardly spaced from said compressor, means forming driving connections between said turbine and said reduction gearing transmission and between said transmission and said hollow driving sleeve for rotation of said hollow driving sleeve upon rotation of said turbine through said reduction gearing transmission, and means forming a driving connection between said hollow driving sleeve and said propeller.

3. In a turboprop engine of the character described and including a rotating propeller and coaxially aligned compressor and turbine elements, said coaxially aligned elements being disposed behind said propeller and axially in the sequence recited and including separate main drive and compressor drive turbines for driving respectively said propeller and said compressor as a result of hot gases from said combustion chamber impinging on said turbines, the combination which comprises reduction gearing transmission means interposed between said coaxially aligned compressor and turbine elements, a hollow driving sleeve, means for mounting said hollow driving sleeve for rotation around at least a portion of said compressor adjacent said propeller and radially outwardly spaced from said compressor, means forming driving connections between said main drive turbine and said reduction gearing transmission and between said transmission and said hollow driving sleeve for rotation of said hollow driving sleeve upon rotation of said main drive turbine through said reduction gearing transmission, and means forming a driving connection between said hollow driving sleeve and said propeller.

4. A turboprop engine as recited in claim 1 in which said turbine elements include separately operating coaxially disposed turbines for separately driving said compressor and said propeller, and in which said reduction gearing transmission means are interposed between said compressor and both of said turbines.

5. A turboprop engine as recited in claim 4 in which said turbine for driving said propeller is axially preposed to said turbine for driving said compressor, and in which said turbine for driving said compressor is directly connected thereto by an axial shaft, while said turbine for driving said propeller is connected to said transmission means by a hollow shaft disposed coaxially around said shaft connecting said compressor driving turbine to said compressor.

6. A turboprop engine as recited in claim 1 in which said reduction gearing transmission for driving said hollow driving sleeve comprises a plurality of parallel gear trains symmetrically disposed around the axis of said compressor and turbine elements, an internal gear ring on said hollow driving sleeve in meshing engagement with said plurality of parallel gear trains, and a central gear for driving said plurality of gear trains and disposed coaxially with and interposed axially between said compressor and turbine elements, said central gear being directly connected to said turbine.

7. In a turboprop engine of the character described and having a rotating propeller and coaxially aligned compressor and turbine engine elements, including a combustion chamber and separate main drive and compressor drive turbine turbine means for driving respectively said propeller and said compressor as a result of hot gases from said combustion chamber impinging on said turbine means, the combination which comprises reduction gearing transmission means interposed between said coaxially aligned compressor and said main drive turbine means, a hollow driving sleeve, means for mounting said hollow driving sleeve for rotation around at least a portion of said compressor adjacent said propeller and radially outwardly spaced from said compressor, means forming driving connections between said main drive turbine and said reduction gearing transmission and between said transmission and said hollow driving sleeve for rotation of said hollow driving sleeve upon rotation of said main drive turbine through said reduction gearing transmission, a shaft interconnecting said compressor and said compressor drive turbine means, said means forming said driving connection between said main drive turbine and said transmission including a hollow drive shaft rotating with said turbine about the axis thereof and coaxially around said shaft interconnecting said compressor and compressor drive turbine, and means forming a driving connection between said hollow driving sleeve and said propeller.

References Cited in the file of this patent
UNITED STATES PATENTS

| 2,702,985 | Howell | Mar. 1, 1955 |
| 2,831,543 | Matthews | Apr. 22, 1958 |

FOREIGN PATENTS

| 999,320 | France | Oct. 3, 1951 |